United States Patent
James et al.

(10) Patent No.: US 10,443,733 B2
(45) Date of Patent: Oct. 15, 2019

(54) SEAL ASSEMBLY WITH ENERGIZER AND SEAL ELEMENT

(71) Applicant: Trelleborg Sealing Solutions US, Inc., Fort Wayne, IN (US)

(72) Inventors: Stephen James, Fort Wayne, IN (US); Mark C. Sitko, Fort Wayne, IN (US); Simone Kaare Thorndal, Copenhagen (DK); Gert Iversen, Helsingoer (DK)

(73) Assignee: Trelleborg Sealing Solutions, Inc., Fort Wayne, IN (US)

( * ) Notice: Subject to any disclaimer, the term of this patent is extended or adjusted under 35 U.S.C. 154(b) by 6 days.

(21) Appl. No.: 15/729,094

(22) Filed: Oct. 10, 2017

(65) Prior Publication Data

US 2019/0107203 A1    Apr. 11, 2019

(51) Int. Cl.
*F16J 15/32*     (2016.01)
*F16J 15/3208*   (2016.01)
*F16J 15/3276*   (2016.01)

(52) U.S. Cl.
CPC ....... *F16J 15/3208* (2013.01); *F16J 15/3276* (2013.01)

(58) Field of Classification Search
CPC ...... F16J 15/32; F16J 15/3204; F16J 15/3208; F16J 15/3268; F16J 15/3276
See application file for complete search history.

(56) References Cited

U.S. PATENT DOCUMENTS

| 4,560,174 A * | 12/1985 | Bisi | B62D 55/088 |
| | | | 277/382 |
| 4,709,932 A * | 12/1987 | Edlund | F16J 15/3204 |
| | | | 277/550 |
| 4,723,782 A * | 2/1988 | Muller | F16J 15/164 |
| | | | 277/589 |
| 5,082,295 A * | 1/1992 | Wetzel | F16J 15/3232 |
| | | | 277/550 |
| 5,104,131 A * | 4/1992 | Edlund | F16J 15/3208 |
| | | | 277/556 |
| 6,497,415 B2 | 12/2002 | Castleman et al. | |
| 7,341,258 B2 * | 3/2008 | Holt | F16J 15/166 |
| | | | 277/584 |

FOREIGN PATENT DOCUMENTS

EP    0 670 444 A1    4/1992

* cited by examiner

*Primary Examiner* — Gilbert Y Lee
(74) *Attorney, Agent, or Firm* — Taylor IP, P.C.

(57) ABSTRACT

A seal assembly for sealing between a first machine part and a second machine part. The first machine part has a housing groove with a side wall. The seal assembly includes a compression ring for being placed within the housing groove and a seal element for being placed within the housing groove. The seal element is energized by the compression ring and separates the compression ring from the side wall of the housing groove and the second machine part. The seal element has a seal bottom portion with a seal apex for contacting the second machine part, and a seal back portion for contacting the side wall of the housing groove. In a first position of the seal element the seal back portion extends axially inwardly from the side wall of the housing groove.

16 Claims, 2 Drawing Sheets

SEAL ASSEMBLY WITH ENERGIZER AND SEAL ELEMENT

BACKGROUND OF THE INVENTION

1. Field of the Invention

The present invention relates to seals, and, more particularly, to seals which include an energizer and a seal element.

2. Description of the Related Art

Seals are typically incorporated into machines that contain a working fluid which is to be contained in a specific region. For example, a seal element may be utilized between static and/or dynamic parts of the machine in order to separate machine parts from the working fluid. Generally, one or both of the machine parts which contact the seal element may include a gland which houses the seal element. For instance, some hydraulic mechanisms include annular seals to seal between a stationary cylinder and a dynamic piston. The cylinder and/or the piston may include the gland which houses the seal element.

An annular seal assembly may consist of two parts: a seal element and a compression ring. The plastic seal element may be energized by the elastomeric compression ring. This configuration allows the seal element to be made from a resilient material which does not possess the elasticity necessary to maintain contact force and to adjust to the movement between adjacent machinery parts which occur in practice. Hence, the compression ring is shielded against the friction, while wear and tear which is present at the seal face. Such seals may be used in a variety of demanding applications, for instance in the aerospace industry. The seal element is generally made from a suitable plastic material e.g. polytetrafluoroethylene (PTFE) while the compression ring can be a standard O-ring made from a rubber material suited to the thermal and chemical loads found at the location of the seal element.

U.S. Pat. No. 6,497,415 describes a seal design in which the compression ring is partially surrounded and supported by the seal element. The seal element firmly contacts the housing groove, which thereby limits the radial and rotational flexibility of the seal. This design allows seals to combine high sealing efficiency with radially compact housing grooves. The seal has a wide pressurized contact face, which is the distance between the seal apex and the wall of the housing groove downstream from the pressure to be sealed. Despite the efficiency of these seals certain shortcomings and design limitations may be encountered in practice. For example, due to the wide distance between the seal apex and the groove wall, at high sealed pressure the wide contact face increases the total contact force with the moving machine part which contributes to friction and thus reduces the seal efficiency. Also, for example, the design of the seal apex may cause ineffective support of the compression ring and thus misalignment of the compression ring's position. This misalignment of the compression ring's position can lead to instances where the seal will not backpump, i.e., allow pressure back under the seal, which may then ultimately cause high leakage.

EP0670444 B1 teaches a compression ring on top of the seal element. The seal element has an angled contact face, thereby allowing the seal element to tilt within the housing groove of the machine part such that the seal element fully contacts and rests against the wall of the housing. The apex of the seal element is formed against the opposite machinery part. The compression ring may also rotate along with the rotation of the seal element. The substantial rotation of the seal element and the compression ring over time may impact the machine life of the seal element and the and the reliability of the seal.

What is needed in the art is a cost-effective and reliable seal assembly for providing a sufficient seal under various pressures.

SUMMARY OF THE INVENTION

The present invention provides a seal assembly for sealing a first machine part and a second machine part. The seal assembly generally includes a compression ring and a seal element. The seal element includes a secondary support face, a cavity, and an angled back portion.

The invention in one form is directed to a seal assembly for sealing between a first machine part and a second machine part. The first machine part has a housing groove with a side wall. The seal assembly includes a compression ring for being placed within the housing groove and a seal element for being placed within the housing groove. The seal element is energized by the compression ring and separates the compression ring from the side wall of the housing groove and the second machine part. The seal element has a seal bottom portion with a seal apex for contacting the second machine part, and a seal back portion for contacting the side wall of the housing groove. In a first position of the seal element the seal back portion extends axially inwardly from the side wall of the housing groove.

The invention in another form is directed to a seal assembly for sealing between a first machine part and a second machine part. The first machine part has a housing groove with a side wall. The seal assembly includes a compression ring for being placed within the housing groove and a seal element for being placed within the housing groove. The seal element is energized by the compression ring. The seal element separates the compression ring from the side wall of the housing groove and the second machine part. The seal element has a seal bottom portion and a seal back portion for contacting the side wall of the housing groove. The seal bottom portion has a seal apex for contacting the second machine part and a secondary support face which is positioned in front of the seal apex.

The invention in yet another form is directed to a seal assembly for sealing between a first machine part and a second machine part. The first machine part has a housing groove with a side wall. The seal assembly includes a compression ring for being placed within the housing groove and a seal element for being placed within the housing groove. The seal element is energized by the compression ring. The seal element separates the compression ring from the side wall of the housing groove and the second machine part. The seal element having a seal bottom portion and a seal back portion for contacting the side wall of the housing groove. The seal bottom portion having a seal apex for contacting the second machine part and a secondary support face which is positioned in front of the seal apex. In a first position of the seal element the seal back portion extends axially inwardly from the side wall of the housing groove.

An advantage of the present invention is the seal apex can adjust correlatively to the sealed pressure.

Another advantage of the present invention is the seal element protects the seal apex and the seal element increases the support and containment of the compression ring.

Yet another advantage of the present invention is eliminating or reducing the potential for damage of the contact edge with the groove bottom.

Still yet another advantage of the present invention is the angled seal back portion reduces the radial volume and creates an easier manipulation, e.g., kidney bearing of the seal.

Still yet another advantage of the present invention is that an angle is formed between the angled seal back portion and the side wall of the housing groove, which imparts greater flexibility to the seal element during installation and operation of the seal assembly.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

Figure 1:
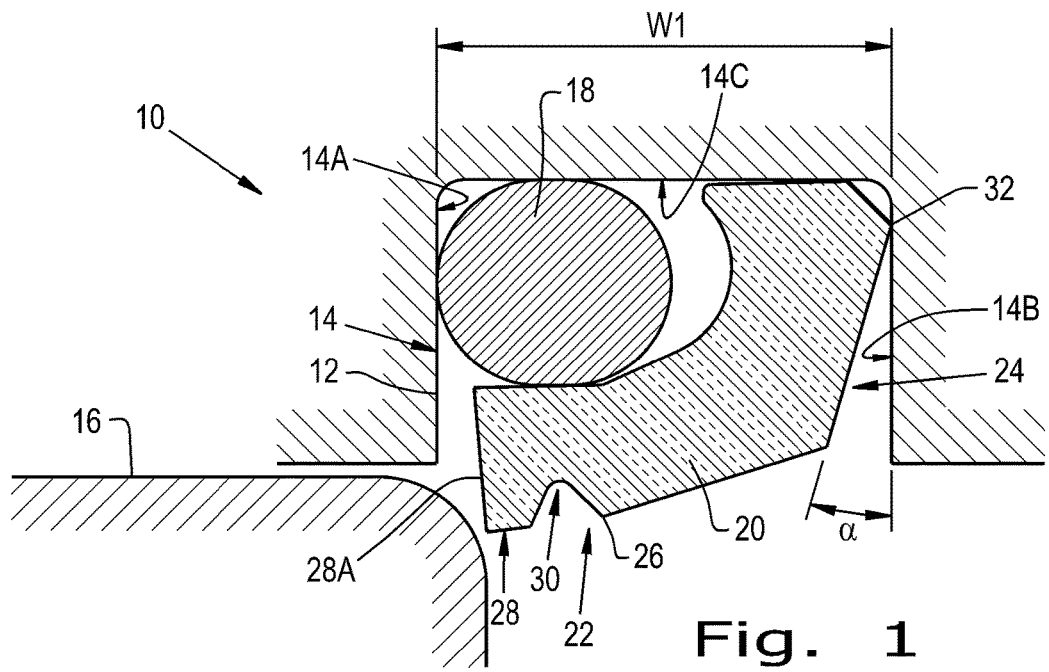
FIG. 1 is a cross-sectional view of an embodiment of a seal assembly formed according to the present invention with a compression ring and a seal element in a position before installation of the seal assembly.

Referring now to the drawings, and more particularly to FIG. 1, there is shown an embodiment of a pre-installed seal assembly 10 formed according to the present invention for sealing a fluid, such as a liquid or gas between a first machine part 12, for example a static machine part 12 with a housing groove 14, and a second machine part 16, for example a moving machine part 16. The housing groove 14 may be incorporated within the static machine part 12 or the dynamic machine part 16. The dynamic machine part 16 may be in the form of a rotating rod 16. The housing groove 14 may include two side walls 14A, 14B, a top wall 14C, and an axial width W1.

The seal assembly 10 generally includes a compression ring 18 and a seal element 20. It should be appreciated that the seal assembly 10 may be incorporated in various applications that incorporate a working fluid which is to be separated from one or more stationary or non-stationary machine part(s). If the dynamic machine part 16 is in the form of a rod 16, the seal assembly 10 may be in the form of a rod seal assembly 10. It should be appreciated that the seal assembly 10 may also include an additional part, for example a non-rectangular back-up-ring, between the seal element 20 and the side wall 14B of the housing groove 14 in order to separate the compression ring 18 from the side wall 14B of the housing groove 14 (not shown).

Figure 4:
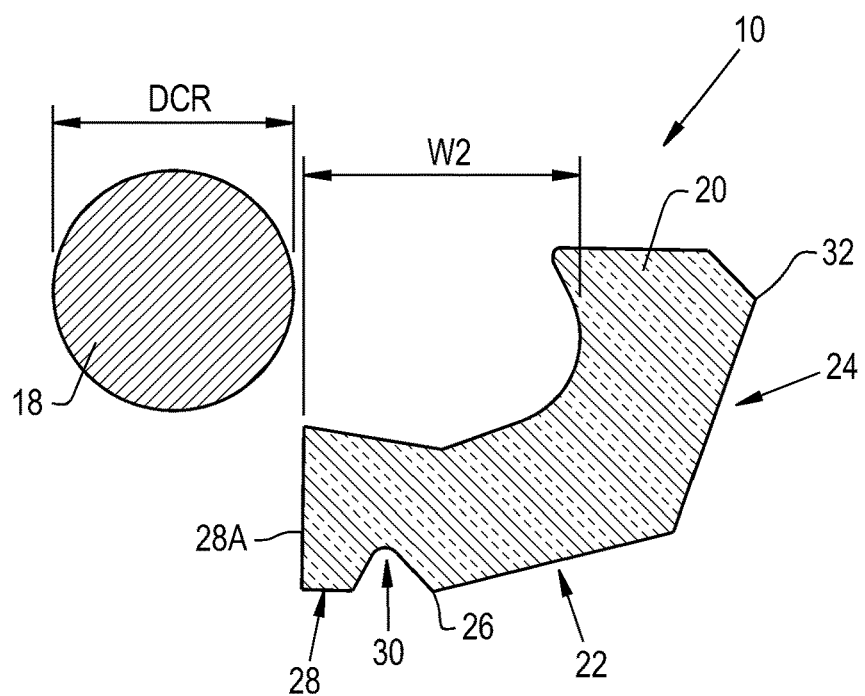
FIG. 4 is a cross-sectional view illustrating the compression ring and the seal element as shown in FIG. 1.

The compression ring 18 may be housed within the housing groove 14. The compression ring 18 may have a diameter DCR (FIG. 4). The axial width W1 of the housing groove 14 may be greater than the diameter DCR of the compression ring 18, for example, by a factor of 1.10 or 1.15. The compression ring 18 may be in the form of any desired ring. For example, the compression ring 18 may be in the form of a deformable O-ring 18. The compression ring 18 may be composed of any suitable material, for example, a rubber material.

Figure 2:
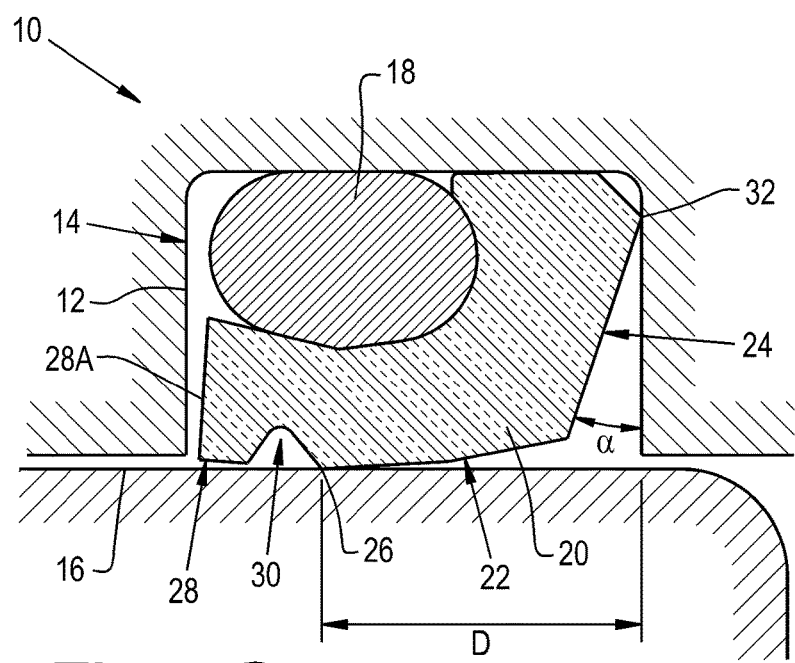
FIG. 2 is a cross-sectional view of the seal assembly shown in FIG. 1 in an installed position in which the seal element is under low pressure.
Figure 3:
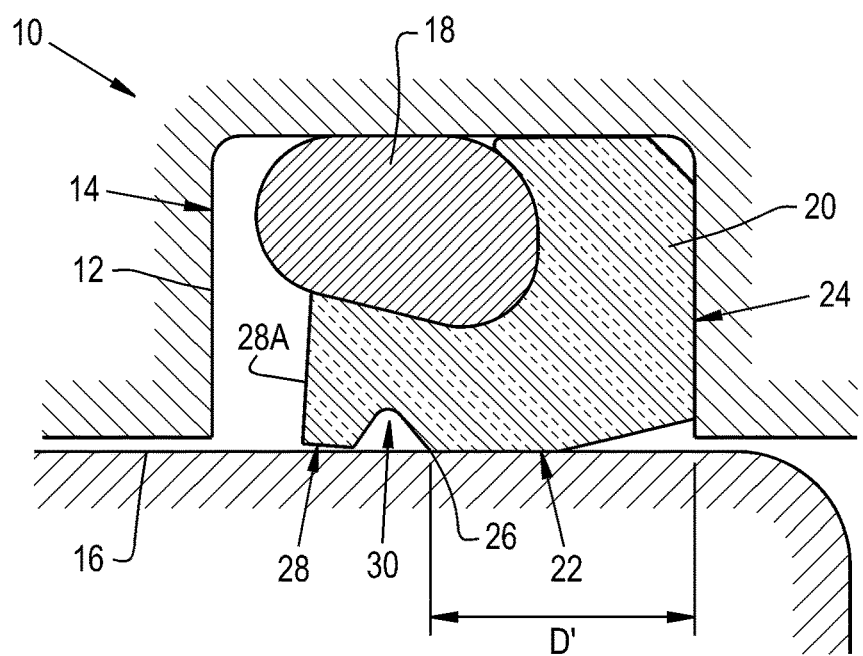
FIG. 3 is a cross-sectional view of the seal assembly shown in FIG. 1 in an installed position in which the seal element is under high pressure.

The seal element 20 may be housed at least partially within the housing groove 14. The seal element 20 may be energized by the compression ring 18. The seal element 20 may be configured for carrying and separating the compression ring 18 from the side wall 14B of the housing groove 14 and the second machine part 16. The seal element 20 may be in the form of an annular seal element 20. The seal element 20 may be monolithically formed and the seal element 20 may include a seal bottom portion 22 and a seal back portion 24. The seal element 20 may also have a carrying width W2 that is optimized for carrying the compression ring 18 (FIG. 4). The seal element 20 may extend beyond the depth of the housing groove 14 before installation (FIG. 1), and the seal element 20 may be at least partially compressed after the seal assembly 10 is installed such that the seal element is located within the housing groove 14 (FIGS. 2-3). The angular mobility, i.e. the rotation, of the seal element 20 may be inhibited due to how the seal element 20 contacts the top wall 14C and side wall 14B of the housing groove 14 as well as the second machine part 16. The seal element 20 may be composed of any resilient material, such as a plastic material.

The seal bottom portion 22 may include a seal apex 26 for contacting the second machine part 16. The bottom portion 22 may also include a secondary support face 28 positioned in front of the seal apex 26, e.g., closer to the side wall 14A of the housing groove 14 and upstream from the seal apex 26 towards the pressure to be sealed. The seal bottom portion 22 may also include a cavity 30 that is interconnected between the secondary support face 28 and the seal apex 26. The cavity 30 may allow the secondary support face 28 to bend or flex relative to the seal apex 26.

The secondary support face 28 may be in the form of a front nose feature 28 which has a blunt contact edge 28A and a bottom edge. The secondary support face 28 protects the seal apex 26 from damage during installation and/or operation of the seal assembly 10. The nose feature 28 may also improve containment of the compression ring 18 during operation of the seal assembly 10. During installation, the second machine part 16 may be inserted from the pressure side against the seal apex 26. Thereby, the nose feature 28 may contact the second machine part 16 first and may shield the seal apex 26 from contacting the dynamic machine part 16. As the second machine part 16 is inserted, the nose feature 28 lifts the seal element 20 and the seal apex 26 away from the second machine part 16. Thus, the seal apex 26 does not come into contact with the second machine part 16 until almost after the second machine part 16 is fully installed, at which time the seal apex 26 lifts the nose feature 28, and the full force from the compression ring 18 acts solely on the seal apex 26. In other words, during installation, the nose feature 28 utilizes the deformation of the seal element 20 such that the nose feature 28 moves radially away from the second machine part 16, and in so doing the seal apex 26 is moved upward and away from contacting the second machine part 16 until the seal assembly 10 is fully installed. The nose feature 28 thereby shields the seal apex 26 from assembly damage without reducing the compression force available at the seal apex 26 or otherwise adversely influencing seal performance during normal service. The nose feature 28 may not extend as far downwardly as the seal apex 26. In this regard, the nose feature 28 may not contact the dynamic machine part 16 after the seal assembly 10 is installed. Hence, the nose feature 28 may not prevent the flow of fluid or gas from reaching seal apex 26. The nose feature 28 may be designed such that when the seal assembly 10 is installed, the contact face of the nose feature 28 matches the diameter of the seal apex 26 or is closer to that of the second machine part 16. The blunt contact edge 28A may prevent clipping of the compression ring 18 and reduce the risk for damage to the seal element 20 during transportation and installation (FIG. 4). The blunt contact edge 28A may end at the opening of the housing groove 14 with a section which is perpendicular with the housing groove opening or which blends into the contact face with the groove opening. The blunt contact edge 28A may at least partially or fully extend over the radial depth of the side wall 14A of the housing groove 14. The nose feature 28 provides for a better resistance to rotation of the seal element 20, and hence better backpumping, as well as for a better area for the compression ring 18 to sit without being damaged.

The seal back portion 24 may be configured for contacting the side wall 14B and/or the top wall 14C of the housing groove 14. The seal back portion 24 may coincide with or contact the side wall 14B of the housing groove 14 at a point close to the top wall 14C of the housing groove 14. For instance, the seal back portion 24 may include a back apex 32 which contacts the side wall 14B in a low pressure position (FIG. 2). The seal back portion 24 may be angled, slanted, and/or curved. For example, the seal back portion 24 may extend downwardly and axially inwardly from the side wall 14B at an angle α. For example, the angle α may be greater than 5 and less than 30°. There may exist an axial separation from seal element 20 and the side wall 14B due to the angled back portion 24. For instance, the axial separation may take place over at least half of the radial depth of the side wall 14B, whereby the angle α between the seal back portion 24 and the side wall 14B increases inversely to achieve a full axial separation near the opening of the housing groove 14. Therefore, a triangular space may exist between the contact surface of the seal back portion 24 and the side wall 14B, as defined by the angle α. The angled seal back portion 24 imparts a degree of axial flexibility to the seal element 20 such that the seal element 20 can flex and move axially with respect to the housing groove 14.

Referring now to FIGS. 2-3, there is shown the seal assembly 10 assembled in the housing groove 14 in a low sealed pressure position (FIG. 2) and a high sealed pressure position (FIG. 3). At a low sealed pressure, the compression ring 18 and the sealed element 20 are less compressed such that only the back apex 32 contacts the side wall 14B of housing groove 14. At a high sealed pressure, the compression ring 18 and the sealed element 20 may be more compressed such that the seal back portion 24 completely contacts the side wall 14B. In this regard, the axial position of the seal apex 26 relative to the side wall 14B also changes under various levels of pressure. For example, under less pressure, the seal element 20 may be less compressed, and the distance D between the side wall 14B and the seal apex 26 may be greater than the distance D' between the side wall 14B and the seal apex 26 at a higher pressure. Thus, the position of the seal apex 26 may dynamically change. Hence, the seal apex 26 is optimized for both high and low pressure conditions. In other words, at high sealed pressure, the seal back portion 24 responds by flexing back to contact the side wall 14B such that the seal element 20 and the seal apex 26 is brought axially closer to the side wall 14B to improve high pressure performance. Inversely, at low sealed pressure, the increased distance from the side wall 14B ensures high radial flexibility of the seal element 20.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A seal assembly for sealing between a first machine part and a second machine part, the first machine part has a housing groove with a side wall, said seal assembly comprising:
   a compression ring for being placed within said housing groove; and
   a seal element for being placed within said housing groove, energized by the compression ring, and separating said compression ring from said side wall of the housing groove and the second machine part, said seal element having a seal bottom portion with a seal apex for contacting the second machine part, and a seal back portion for contacting the side wall of the housing groove, said back portion includes a back apex such that said seal element is axially flexible and axially moves relative to said housing groove so that in a first position of the seal element said seal back portion contacts said side wall at the back apex and the seal back portion extends axially inwardly from said side wall of the housing groove, and in a second position of the seal element the seal back portion completely contacts said side wall.

2. The seal assembly according to claim 1, wherein in said first position said seal apex is located at a first distance from said side wall of the housing groove, and in said second position said seal apex is located at a second distance from said side wall of the housing groove such that said second distance is shorter than said first distance.

3. The seal assembly according to claim 1, wherein said seal back portion extends axially inwardly from said side wall of the housing groove at an angle.

4. The seal assembly according to claim 3, wherein an axial separation between the seal back portion and the side wall of the housing groove takes place over at least a half of said side wall.

5. The seal assembly according to claim 1, wherein said seal bottom portion further includes a secondary support face positioned in front of the seal apex and configured for protecting the seal apex.

6. The seal assembly according to claim 1, wherein said compression ring is in the form of an O-ring and said seal element is in the form of an annular seal composed of a resilient material.

7. A seal assembly for sealing between a first machine part and a second machine part, the first machine part has a housing groove with a side wall, said seal assembly comprising:
   a compression ring for being placed within said housing groove; and a seal element for being placed within said housing groove, energized by the compression ring, and separating said compression ring from said side wall of the housing groove and the second machine part, said seal element having a seal bottom portion and a seal back portion for contacting the side wall of the housing groove, said seal bottom portion having a seal apex for contacting the second machine part and a secondary support face which is positioned in front of the seal apex, and said secondary support face is in the form of a nose feature which is configured for protecting said seal apex and the nose feature does not contact the second machine part.

8. The seal assembly according to claim 7, wherein said seal bottom portion further includes a cavity interconnected between the nose feature and said seal apex.

9. The seal assembly according to claim 7, wherein the secondary support face is designed such that upon installing the seal assembly in the housing groove, a contact face of the secondary support face matches a diameter of the seal apex of the seal element.

10. The seal assembly according to claim 7, wherein the secondary support face does not prevent a seal fluid or gas from reaching the seal apex.

11. A seal assembly for sealing between a first machine part and a second machine part, the first machine part has a housing groove with a side wall, said seal assembly comprising:
   a compression ring for being placed within said housing groove; and
   a seal element for being placed within said housing groove, energized by the compression ring, and separating said compression ring from said side wall of the housing groove and the second machine part, said seal element having a seal bottom portion and a seal back portion for contacting the side wall of the housing groove, said seal bottom portion having a seal apex for contacting the second machine part and a secondary support face which is positioned in front of the seal apex, said back portion includes a back apex such that said seal element is axially flexible and axially moves relative to said housing groove so that in a first position of the seal element said seal back portion contacts said side wall at the back apex and the seal back portion extends axially inwardly from said side wall of the housing groove, and in a second position of the seal element the seal back portion completely contacts said side wall.

12. The seal assembly according to claim 11, wherein in said first position said seal apex is located at a first distance from said side wall of the housing groove, and in said second position said seal apex is located at a second distance from said side wall of the housing groove such that said second distance is shorter than said first distance.

13. The seal assembly according to claim 11, wherein said seal back portion extends axially inwardly from said side wall at an angle.

14. The seal assembly according to claim 11, wherein said secondary support face is in the form of a nose feature which is configured for protecting said seal apex.

15. The seal assembly according to claim 14, wherein said seal bottom portion further includes a cavity interconnected between the nose feature and said seal apex.

16. The seal assembly according to claim 14, wherein said nose feature is configured for resisting a rotation of said seal element and for providing an area for the compression ring to sit without being damaged.

* * * * *